(12) United States Patent
Kato et al.

(10) Patent No.: US 9,821,392 B2
(45) Date of Patent: Nov. 21, 2017

(54) ROTARY MACHINING APPARATUS AND MACHINING METHOD USING THE SAME

(71) Applicant: AISIN AW CO., LTD., Anjo-shi, Aichi-ken (JP)

(72) Inventors: Susumu Kato, Anjo (JP); Akira Takagai, Nishio (JP); Masahiro Otani, Toyokawa (JP)

(73) Assignee: AISIN AW CO., LTD., Anjo (JP)

( * ) Notice: Subject to any disclaimer, the term of this patent is extended or adjusted under 35 U.S.C. 154(b) by 113 days.

(21) Appl. No.: 14/900,830

(22) PCT Filed: Aug. 18, 2014

(86) PCT No.: PCT/JP2014/071530
§ 371 (c)(1),
(2) Date: Dec. 22, 2015

(87) PCT Pub. No.: WO2015/025807
PCT Pub. Date: Feb. 26, 2015

(65) Prior Publication Data
US 2016/0136744 A1    May 19, 2016

(30) Foreign Application Priority Data

Aug. 23, 2013 (JP) ................. 2013-173908

(51) Int. Cl.
*B23F 17/00* (2006.01)
*B23F 5/04* (2006.01)
(Continued)

(52) U.S. Cl.
CPC .............. *B23F 17/001* (2013.01); *B23F 5/04* (2013.01); *B23F 23/04* (2013.01); *B23F 23/1225* (2013.01); *B24B 53/075* (2013.01)

(58) Field of Classification Search
CPC ........ B23F 17/001; B23F 5/04; B24B 53/075; B23Q 3/157
See application file for complete search history.

(56) References Cited

U.S. PATENT DOCUMENTS 5,213,559 A * 5/1993 Lunazzi .................. B23F 23/04
409/7
5,857,896 A    1/1999 Stollberg
(Continued)

FOREIGN PATENT DOCUMENTS

JP    H08-197332 A    8/1996
JP    3045811 U    11/1997
(Continued)

OTHER PUBLICATIONS

Nov. 11, 2014 International Search Report issued in International Patent Application No. PCT/JP2014/071530.

*Primary Examiner* — Larry E Waggle, Jr.
*Assistant Examiner* — Henry Hong
(74) *Attorney, Agent, or Firm* — Oliff PLC

(57) ABSTRACT

A rotary machining apparatus that includes a rotary that supports and rotates a workpiece having helical teeth; a grinding wheel that grinds the helical teeth of the workpiece to be rotated by the rotary with grinding teeth; and a conveyor for carrying the workpiece in and out of the rotary, wherein the conveyor includes, around a turning center axis, a plurality of grippers for sandwiching the workpiece and a plurality of dressers for forming toothed surfaces of the grinding teeth, and turns around the turning center axis so that the grippers sequentially approach the rotary and the dressers sequentially approach the grinding wheel, and dress teeth of the dressers each have different shapes of toothed surfaces.

20 Claims, 6 Drawing Sheets

(51) Int. Cl.
*B24B 53/075* (2006.01)
*B23F 23/04* (2006.01)
*B23F 23/12* (2006.01)

(56) References Cited

U.S. PATENT DOCUMENTS

| | | | |
|---|---|---|---|
| 5,885,038 A | 3/1999 | Huber | |
| 8,506,358 B2* | 8/2013 | Amarell | B23F 23/04 |
| | | | 409/9 |
| 2007/0202774 A1* | 8/2007 | Yanase | B23F 23/1225 |
| | | | 451/5 |
| 2011/0081833 A1 | 4/2011 | Amarell et al. | |
| 2013/0225379 A1* | 8/2013 | Kato | B23Q 3/157 |
| | | | 483/1 |
| 2013/0280990 A1* | 10/2013 | Geiser | B23F 5/04 |
| | | | 451/47 |
| 2014/0256223 A1* | 9/2014 | Geiser | B23F 23/1218 |
| | | | 451/5 |

FOREIGN PATENT DOCUMENTS

| | | |
|---|---|---|
| JP | H10-58230 A | 3/1998 |
| JP | 2005-011600 A | 1/2005 |
| JP | 2011-079127 A | 4/2011 |

* cited by examiner

ROTARY MACHINING APPARATUS AND MACHINING METHOD USING THE SAME

BACKGROUND

The present disclosure relates to a rotary machining apparatus including a machining unit for grinding a rotating workpiece with a grinding wheel and a machining method using the rotary machining apparatus.

In a rotary machining apparatus for grinding a workpiece to be rotated by a rotary unit with a grinding wheel of a machining unit, the grinding wheel is appropriately formed by using a dresser based on the type of a workpiece to be machined. For example, for a grinding wheel for grinding helical teeth of a workpiece, a dresser is prepared for each type of a workpiece, and a pressure angle and a tooth profile roundness (a convex shape of a curved surface from the root to the tip of a tooth) in a toothed surface of the grinding wheel are adjusted.

Japanese Patent Application Publication No. 2005-111600, for example, discloses a gear grinding machine including, on a bed, a table that rotates while holding a workpiece thereon, a counter column supporting one end of the workpiece, and a column along which a wheel spindle on which a grinding wheel for grinding the workpiece is mounted moves forward and backward. In the gear grinding machine, a ring-like member turntable around the outer periphery of the counter column is provided with a dressing device for dressing the grinding wheel mounted to the wheel spindle. In this manner, in the gear grinding machine, the dressing device is rationally laid out.

Japanese Patent Application Publication No. H8-197332, for example, discloses a gear toothed surface modifying method for modifying a toothed surface of a gear so that partial contact is prevented based on misalignment of gear shafts when arranging gears. In this toothed surface modifying method, the amount of crowning and the amount of tooth profile roundness with which partial contact can be avoided in a toothed surface having errors obtained by converting misalignment into a pressure angle error and a helix angle error are obtained in order to keep a minimum intermeshing transmission error.

SUMMARY

However, in the gear grinding machine of Japanese Patent Application Publication No. 2005-111600, only one dressing device is disposed, and the dressing device needs to be replaced with another dressing device for each type of workpieces. Thus, it takes time to replace dressing devices, so that productivity of a helical gear is not sufficiently increased. In Japanese Patent Application Publication No. H8-197332, no specific contrivance is made on a dressing device.

The present disclosure, according to an exemplary aspect, provides a rotary machining apparatus that can quickly and easily form a toothed surface of a grinding wheel and can enhance productivity of a helical gear, and a machining method using the rotary machining apparatus.

According to an exemplary aspect of the present disclosure, a rotary machining apparatus includes a rotary that supports and rotates a workpiece having helical teeth; a grinding wheel that grinds the helical teeth of the workpiece to be rotated by the rotary with grinding teeth; and a conveyor for carrying the workpiece in and out of the rotary, wherein the conveyor includes, around a turning center axis, a plurality of grippers for sandwiching the workpiece and a plurality of dressers for forming toothed surfaces of the grinding teeth, and turns around the turning center axis so that the grippers sequentially approach the rotary and the dressers sequentially approach the grinding wheel, and dress teeth of the dressers each have different shapes of toothed surfaces.

According to another aspect of the present disclosure, in a machining method using the rotary machining apparatus, the grinding wheel grinds a plurality of types of workpieces having different shapes of the toothed surfaces of the helical teeth by using the grinding teeth formed by the dressers.

The conveyor of the rotary machining apparatus includes the plurality of dressers for forming the toothed surfaces of the grinding teeth of the grinding wheel around the turning center axis. The dress teeth of the dressers each have different shapes of toothed surfaces.

In forming the toothed surfaces of the grinding teeth of the grinding wheel by using the dressers, one of the dressers having dress teeth shaped with necessary toothed surfaces is selected based on the type of a workpiece. Then, the conveyor is turned around the turning center axis and causes the selected dresser to approach the grinding wheel. In this manner, the necessary dresser can easily face the grinding wheel by turning the conveyor.

Thus, in the rotary machining apparatus, one of the dressers having dress teeth shaped with necessary toothed surfaces may be selected based on the type of a workpiece, and the toothed surfaces of the grinding teeth of the grinding wheel can be quickly and easily formed. In addition, the frequency of replacing dressers can be reduced, thereby enhancing productivity of a helical gear produced by grinding helical teeth of the workpiece with the grinding teeth of the grinding wheel.

In the rotary machining apparatus, the workpiece is grinded in the following manner.

When carrying the workpiece in the rotary, the workpiece sandwiched by the grippers is caused to approach the rotary by turning the conveyor and then is supported by the rotary. Thereafter, the helical teeth of the workpiece to be rotated by the rotary are grinded by using the grinding teeth of the grinding wheel. Subsequently, when carrying the workpiece out of the rotary, the grinded workpiece is sandwiched by the grippers from the rotary, and the conveyor is turned.

In the machining method using the rotary machining apparatus, effects of the rotary machining apparatus can be obtained, and productivity of a plurality of types of helical gears can be enhanced.

DETAILED DESCRIPTION OF EMBODIMENTS

Figure 1:
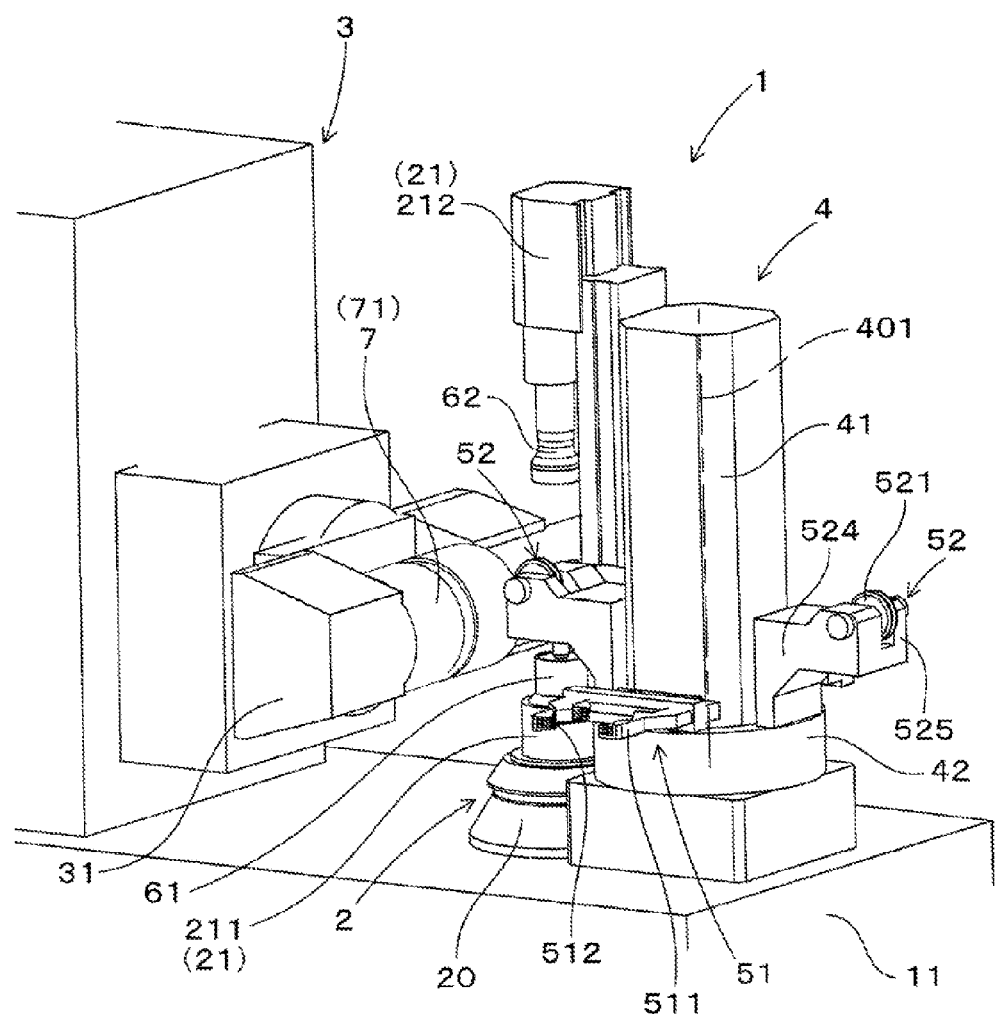
FIG. 1 is a perspective view illustrating a rotary machining apparatus according to an embodiment.

Preferred embodiments of the rotary machining apparatus described above and the machining method using the rotary machining apparatus will be described.

In the rotary machining apparatus, the dress teeth of the dressers may have different shapes of toothed surfaces in order to form the toothed surfaces of the grinding teeth in such a manner that at least one of a pressure angle and a tooth profile roundness differs among the toothed surfaces of the helical teeth of the workpiece.

In this case, the use of the plurality of dressers enables the rotary machining apparatus to grind helical teeth of a plurality of types of workpieces having differences in at least one of a pressure angle and a tooth profile roundness in the toothed surface.

In the conveyor, the turning loader part may be turnably provided at the turning support pole through which the turning center axis passes. The grippers may be provided at the outer periphery of the turning loader part so as to be movable in the up-down direction. The grippers may sandwich the workpiece by using a pair of sandwiching parts that open and close laterally. The dressers may be fixed to the outer periphery of the turning loader part so as not to be movable in the up-down direction.

In this case, the grippers are caused to move in the up-down direction, thereby quickly and easily carrying the workpiece in and out of the rotary. Since the dressers are fixed so as not to be movable in the up-down direction, accuracy in forming the grinding teeth of the grinding wheel can be increased.

The rotary supports the workpiece with the workpiece supporting jig in the up-down direction. The workpiece supporting jig includes the upper jig part to be mounted to the upper supporting part of the rotary and the lower jig part to be mounted to the lower supporting part of the rotary. The grippers may sandwich the lower jig part on which the upper jig part is mounted, as well as sandwiching the workpiece.

In this case, the workpiece supporting jig for supporting the workpiece on the rotary is sandwiched by the grippers of the conveyor, and can be carried in and out of the rotary. Accordingly, when the type of a workpiece to be machined is changed, the workpiece supporting jig for supporting the workpiece can be quickly and easily replaced.

In the machining method using the rotary machining apparatus, the plurality of types of workpieces to be grinded with the grinding teeth of the grinding wheel may be a pair of gears to be intermeshed with each other and to be used.

In this case, a pair of gears to be intermeshed with each other can be efficiently produced by using one rotary machining apparatus.

The pair of gears produced by the machining method using the rotary machining apparatus may be a pair of gears to be used in an automobile transmission. In this case, the shape of the toothed surface is made slightly different between a driving gear and a driven gear so that unevenness of tooth contact is prevented due to inclination of the gears when the gears are intermeshed.

Embodiment

A rotary machining apparatus and a machining method using the rotary machining apparatus according to an embodiment will be described with reference to the drawings.

Figure 2:
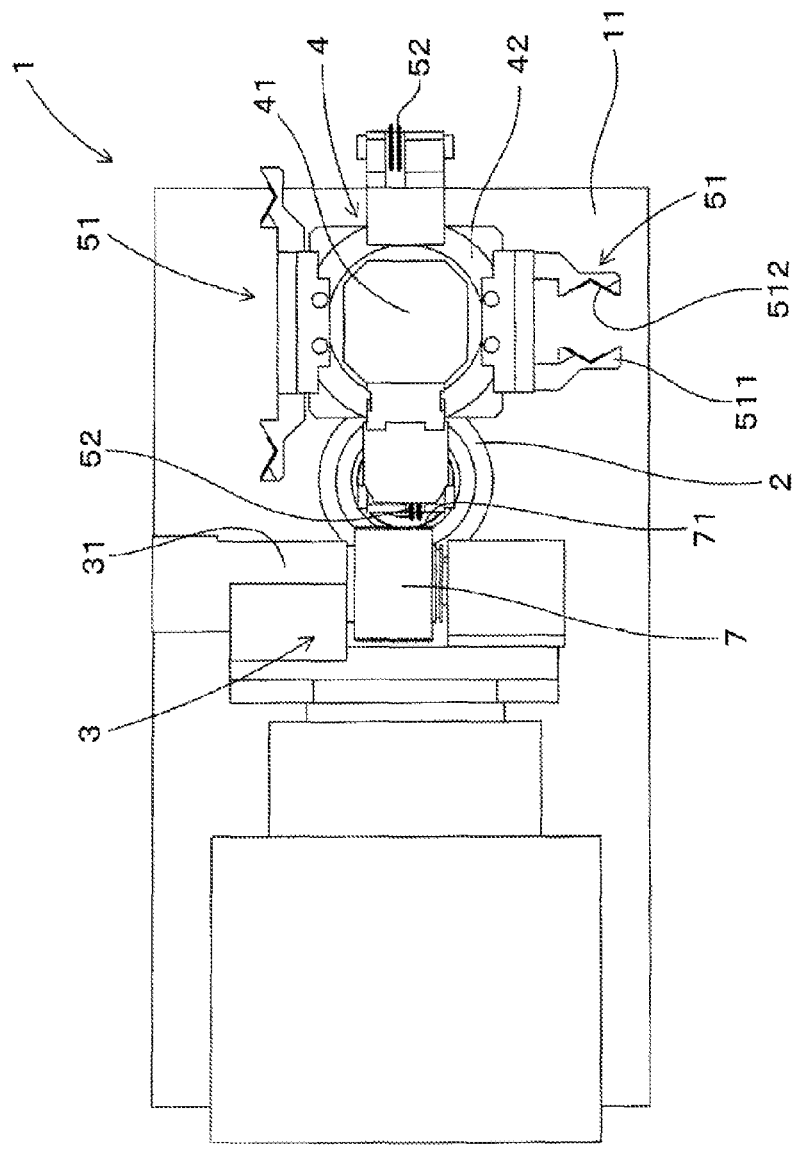
FIG. 2 is a top view illustrating the rotary machining apparatus according to the embodiment.

As illustrated in FIGS. 1 and 2, a rotary machining apparatus 1 according to this embodiment includes: a rotary unit 2 (i.e., a rotary) for supporting and rotating a workpiece 8 having helical teeth 81; a machining unit 3 for grinding the helical teeth 81 of the workpiece 8 to be rotated by the rotary unit 2 with grinding teeth 71 of a grinding wheel 7; and a conveyor 4 for carrying the workpiece 8 in and out of the rotary unit 2.

Figure 3:
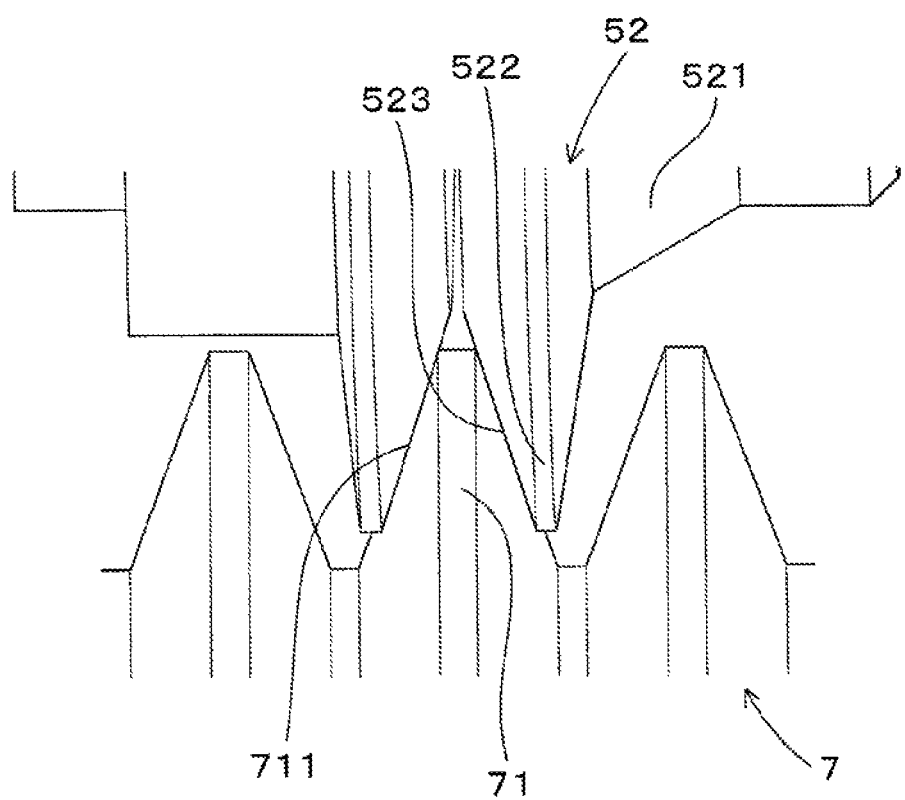
FIG. 3 is an explanatory view illustrating a state where grinding teeth of a grinding wheel is formed by using a dresser in an enlarged manner according to the embodiment.

The conveyor 4 includes a plurality of grippers 51 for sandwiching the workpiece 8 and a plurality of dressers 52 for forming grinding teeth 71. The grippers 51 and the dressers 52 are disposed around a turning center axis 401. The conveyor 4 turns around the turning center axis 401 so that the grippers 51 sequentially approach the rotary unit 2 and the dressers 52 sequentially approach the machining unit 3. As illustrated in FIG. 3, dress teeth 522 of the dressers 52 have different shapes of toothed surfaces 523.

The rotary machining apparatus 1 and the machining method using the rotary machining apparatus 1 according to this embodiment will be described with reference to FIGS. 1 to 6.

Figure 4:
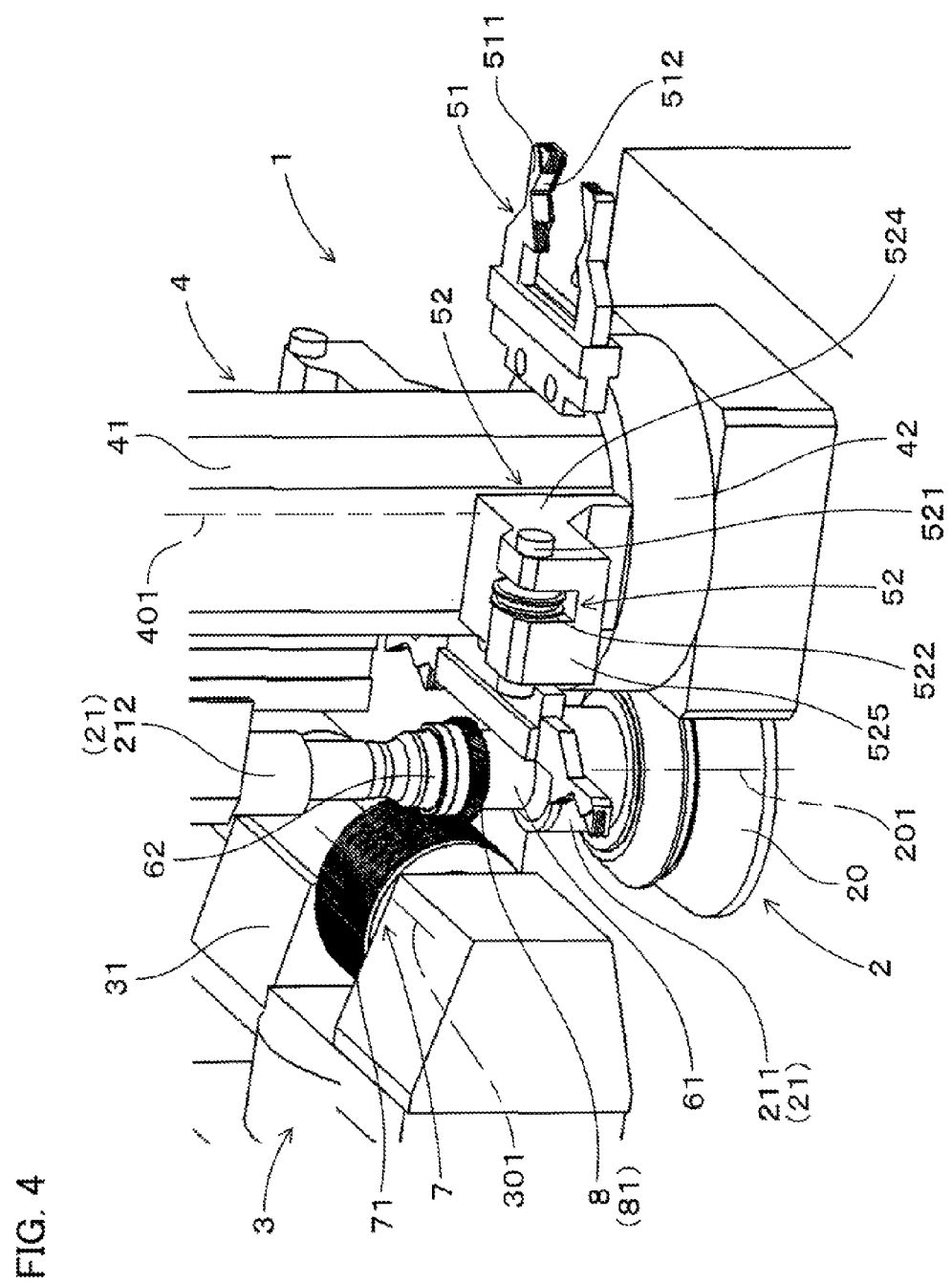
FIG. 4 is a perspective view illustrating the rotary machining apparatus in a state where helical teeth of a workpiece are grinded by using the grinding teeth of the grinding wheel according to the embodiment.

As illustrated in FIG. 4, the machining unit 3 and the rotary unit 2 according to this embodiment constitute a gear grinding machine for grinding helical teeth 81 formed on the outer periphery of the workpiece 8, by using the grinding teeth 71 of the grinding wheel 7. The rotary machining apparatus 1 of this embodiment enables conveyance of the workpiece 8 and setup (replacement) of a workpiece supporting jig 6 supporting the workpiece 8 in the gear grinding machine. In the machining unit 3 and the rotary unit 2 of this embodiment, toothed surfaces 811 of the helical teeth 81 of the workpiece 8 are finish-machined, and helical gears as products are manufactured. The helical gears may be spiral gears used in such a manner that the axial directions of intermeshed gears are parallel with each other or screw gears used in such a manner that the axial directions of intermeshed gears are orthogonal to each other.

Figure 5:
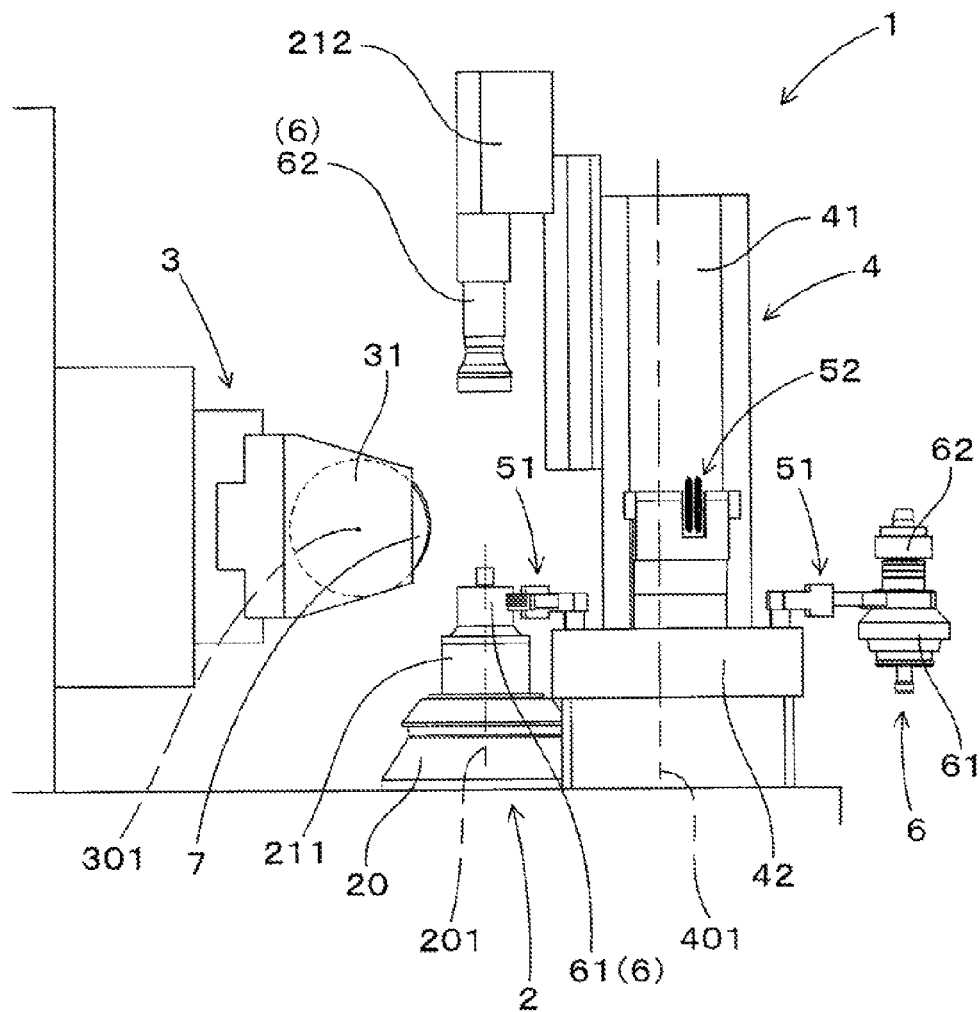
FIG. 5 is a front view illustrating the rotary machining apparatus in a state where a workpiece supporting jig is carried in and out according to the embodiment.

As illustrated in FIG. 5, in the machining unit 3, a rotation center axis 301 of a grinding wheel holder (wheel spindle) 31 to which the grinding wheel 7 is mounted is tilted relative to a horizontal direction. The rotary unit 2 rotates around a rotation center axis 201 that extends in the up-down direction.

In the machining unit 3, the grinding wheel holder 31 can rotate around a rotation center axis 300 extending orthogonally to or intersecting with the rotation center axis 201 of the rotary unit 2, and can move in the front-rear direction, the left-right direction, and the up-down direction. The grinding wheel holder 31 holds shaft portions of the grinding wheel 7 at both ends thereof. The rotary unit 2 is disposed in a space between the machining unit 3 and the conveyor 4.

The machining unit 3 grinds a plurality of types of workpieces 8 having different shapes of the toothed surfaces 811 of the helical teeth 81, by using the grinding teeth 71 formed by the dressers 52. The plurality of types of workpieces 8 in this embodiment are a pair of gears that are intermeshed with each other and are used in an automobile transmission.

As illustrated in FIG. 4, the rotary unit 2 supports the workpiece 8 with the workpiece supporting jig 6 in the up-down direction. The rotary unit 2 includes a jig supporting part 21 including an upper supporting part 212 and a lower supporting part 211. The workpiece supporting jig 6 includes an upper jig part 62 to be mounted to the upper supporting part 212 of the rotary unit 2 and a lower jig part 61 to be mounted to the lower supporting part 211 of the rotary unit 2, and sandwiches the workpiece 8 from the up-down direction. The workpiece 8 is supported by the rotary unit 2 with an axial direction thereof facing in the up-down direction.

The rotary unit 2 supports the workpiece 8 with the workpiece supporting jig 6 from both sides thereof in the up-down direction, and rotates around the rotation center axis 201 extending in parallel with the turning center axis 401 of the conveyor 4. The lower supporting part 211 of the rotary unit 2 is attached to an upper end of a rotary table 20 that is rotated by a driving source such as a motor. The upper supporting part 212 of the rotary unit 2 is attached to a turning support pole 41 of the conveyor 4 so as to be slidable by an actuator in the up-down direction.

As illustrated in FIGS. 1 and 2, in the conveyor 4, a turning loader part 42 is turnably provided at the turning support pole 41 through which the turning center axis 401 passes. The grippers 51 are provided at the turning loader part 42 in such a manner that the grippers 51 are driven by an actuator so as to be movable in the up-down direction. Each of the grippers 51 sandwiches the workpiece 8 by using a pair of sandwiching parts 511 that open and close laterally when being driven by another actuator. The dressers 52 are fixed to the turning loader part 42 so as not to move in the up-down direction. The turning center axis 401 of the turning support pole 41 extends in the up-down direction. The grippers 51 and the dressers 52 are caused to turn horizontally around the turning support pole 41 by the turning loader part 42.

As illustrated in FIGS. 2 and 5, each of the grippers 51 sandwiches the workpiece 8 and also sandwiches the lower jig part 61 on which the upper jig part 62 is mounted. Each of the grippers 51 sandwiches an outer peripheral portion of the workpiece 8 in which the helical teeth 81 are formed, or an outer peripheral portion of the lower jig part 61. The grippers 51 can sandwich different types of workpieces 8 having different outside diameters and the lower jig part 61 by changing the distance between the pair of sandwiching parts 511. Inner surfaces 512 of the pair of sandwiching parts 511 are formed in a V shape whose tilt surfaces are in contact with two circumferential portions of the workpiece 8 and the lower jig part 61 in order to allow the workpiece 8 and the lower jig part 61 to be sandwiched easily.

The conveyor 4 is a turning loader that enables each of the grippers 51 arranged at the same radial distance from the turning center axis 401 to be sequentially turned to face the rotary unit 2. Each of the grippers 51 can directly sandwich the workpiece 8 and the workpiece supporting jig 6 individually. In the conveyor 4, each of the grippers 51 sandwiches the workpiece 8 or the workpiece supporting jig 6, and the turning loader part 42 is turned so that the workpiece 8 or the workpiece supporting jig 6 is conveyed between the conveyor 4 and the rotary unit 2.

As illustrated in FIGS. 4 and 5, each of the grippers 51 holds the workpiece 8 or the workpiece supporting jig 6 from the direction orthogonal to the turning center axis 401 of the conveyor 4 and the rotation center axis 201 of the rotary unit 2, and passes between the lower supporting part 211 and the upper supporting part 212 of the rotary unit 2.

The grippers 51 of this embodiment are disposed at two locations shifted by 180 degrees from each other in the circumferential direction of the turning loader part 42. The dressers 52 are disposed at two locations shifted by 180 degrees in the circumferential direction, and shifted by 90 degrees in phase from the locations at which the grippers 51 are disposed. The grippers 51 may be provided at three or more locations around the turning loader part 42, and the dressers 52 may also be provided at three or more locations around the turning loader part 42.

As illustrated in FIG. 4, each of the dressers 52 includes a rotary shaft 521 having dress teeth 522 and a supporting bracket 524 provided with a pair of support parts 525 rotatably supporting end portions of the rotary shaft 521. The dress teeth 52 of the rotary shaft 521 are intermeshed with grinding teeth 71 of the grinding wheel 7 and grind toothed surfaces 711 of the grinding teeth 71. The supporting bracket 524 is fixed to the turning loader part 42.

The dress teeth 522 of one of the dressers 52 and the dress teeth 522 of the other dresser 52 have different shapes of toothed surfaces in order to form the toothed surfaces 711 of the grinding teeth 71 in such a manner that at least one of a pressure angle $\alpha$ and a tooth profile roundness $\beta$ differs among the toothed surfaces 811 of the helical teeth 81 of the workpiece 8 to be grinded. The plurality of dressers 52 are provided on the turning loader part 42 of the conveyor 4 in order to finely adjust at least one of the pressure angle $\alpha$ and the tooth profile roundness $\beta$ in the toothed surfaces 811 formed on the helical teeth 81 of the workpiece 8.

Figure 6:
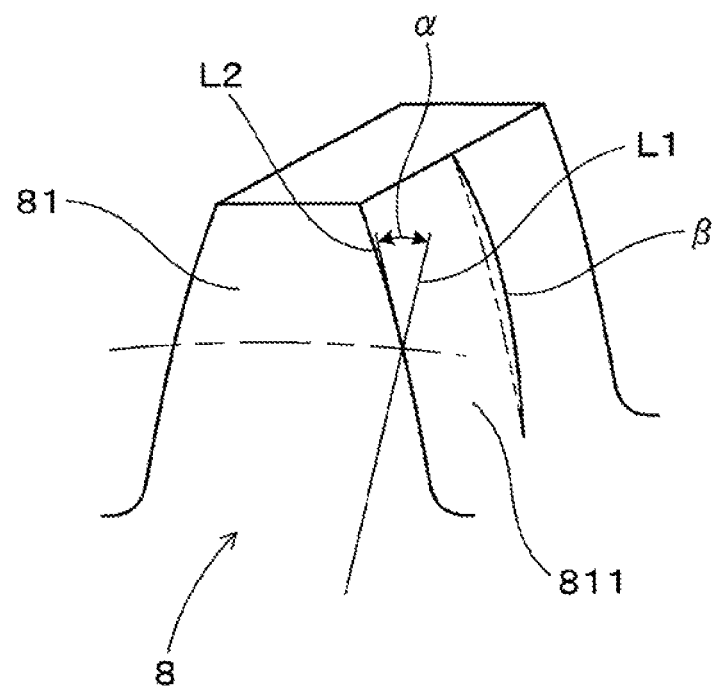
FIG. 6 is a perspective view illustrating the helical teeth of the workpiece according to the embodiment.

As illustrated in FIGS. 3 and 6, the toothed surfaces 523 of the dress teeth 522 of the dressers 52 are formed by using the toothed surfaces 711 of the grinding teeth 71 of the grinding wheel 7 in order to grind the helical teeth 81 in such a manner that the helical teeth 81 have a necessary pressure angle $\alpha$ and a necessary roundness $\beta$. The shapes of the toothed surfaces 523 of the dress teeth 522 of the dressers 52 determine the pressure angle $\alpha$ and the roundness $\beta$ of the helical teeth 81 of the workpiece 8 formed by using the grinding teeth 71. The pressure angle $\alpha$ is expressed as an angle formed by a radial line L1 from the center of the workpiece 8 to the radial direction thereof and a tangent L2 to the tooth profile. The tooth profile roundness $\beta$ is expressed as a convex shape (the radial size of the convex) of a curved surface from the root to the tip of the helical teeth 81.

A helix angle (a tilt angle around the axial direction of the workpiece 8) of the helical teeth 81 of the workpiece 8 can be changed by adjusting the tilt angle of the rotation center axis 301 of the grinding wheel holder 31 holding the grinding wheel 7. Crowning (roundness in a tooth trace direction or a width direction) of the helical teeth 81 of the workpiece 8 can be formed by changing the tilt angle of the rotation center axis 301 of the grinding wheel holder 31 holding the grinding wheel 7 while grinding in the tooth trace direction of the helical teeth 81.

In the rotary machining apparatus 1, the workpiece 8 is grinded with the grinding teeth 71 of the grinding wheel 7 in the following manner.

As illustrated in FIG. 4, when carrying the workpiece 8 in the rotary unit 2, the workpiece supporting jig 6 corresponding to the workpiece 8 to be grinded is mounted on the rotary unit 2 through an operation in which the workpiece supporting jig 6 is sandwiched by the gripper 51 and the turning loader part 42 is turned in the conveyor 4. Then, the workpiece 8 is sandwiched by the gripper 51 and caused to approach the rotary unit 2 by turning the turning loader part 42. Thereafter, the gripper 51 and the upper jig part 62 in the upper supporting part 212 are ascended and descended so that the workpiece 8 is supported between the upper jig part 62 and the lower jig part 61 in the rotary unit 2. Subsequently, the grinding teeth 71 of the grinding wheel 7 in the machining unit 3 grind the helical teeth 81 of the workpiece 8 to be rotated by the rotary unit 2. Then, when carrying the workpiece 8 out of the rotary unit 2, the grinded workpiece 8 is sandwiched by the gripper 51 from the rotary unit 2, and the turning loader part 42 of the conveyor 4 is turned.

In the rotary machining apparatus 1, the grinding teeth 71 of the grinding wheel 7 are formed by using the dress teeth 522 of the dressers 52 in the following manner.

As illustrated in FIGS. 1 and 2, when forming the toothed surfaces 711 of the grinding teeth 71 of the grinding wheel 7 into a predetermined shape, the turning loader part 42 of the conveyor 4 is turned so that the dressers 52 face the grinding wheel 7 of the machining unit 3. Then, as illustrated in FIG. 3, the grinding wheel holder 31 of the machining unit 3 is moved in such a manner that the grinding teeth 71 of the grinding wheel 7 held by the grinding wheel holder 31 are intermeshed with the dress teeth 522 of the dressers 52. The grinding wheel 7 is rotated by the grinding wheel holder 31 and the rotary shaft 521 having the dress teeth 522 of the dressers 52 is rotated so that the toothed surfaces 711 of the grinding teeth 71 of the grinding wheel 7 are formed by using the dress teeth 522. The grinding wheel holder 31 of the machining unit 3 is moved in the axial direction of the grinding wheel 7, and the toothed surfaces 523 of the dress teeth 522 of the dressers 52 are sequentially brought into contact with the entire toothed surfaces 711 of the grinding teeth 71 of the grinding wheel 7, thereby forming the grinding teeth 71 of the grinding wheel 7.

The grinding teeth 71 of the grinding wheel 7 can be formed by being divided into a plurality of portions in the axial direction of the grinding wheel 7. Each of the portions of the grinding teeth 71 may be different in at least one of a module, a pressure angle α, and a tooth profile roundness β of the helical teeth 81 of the workpiece 8. In this case, different dressers 52 can be used in order to form individual portions of the grinding teeth 71 obtained by dividing the grinding teeth 71.

Next, operations and effects of the rotary machining apparatus 1 and the machining method using the rotary machining apparatus 1 according to this embodiment will be described.

When forming the toothed surfaces 711 of the grinding teeth 71 of the grinding wheel 7 in the machining unit 3 by using the dressers 52, one of the dressers 52 having the dress teeth 522 shaped with the necessary toothed surfaces 523 is selected based on the type of the workpiece 8. Then, the turning loader part 42 is turned around the turning center axis 401 of the turning support pole 41, thereby causing the selected dresser 52 to approach the machining unit 3. In this manner, the necessary dresser 52 is easily caused to face the grinding wheel 7 of the machining unit 3 by turning the turning loader part 42.

Accordingly, in the rotary machining apparatus 1 and the machining method using the rotary machining apparatus 1 according to this embodiment, one of the dressers 52 having the dress teeth 522 shaped with the necessary toothed surfaces 523 may be selected based on the type of the workpiece 8. Thus, the toothed surfaces 711 of the grinding teeth 71 of the grinding wheel 7 can be quickly and easily formed. In addition, the frequency of replacing the dressers 52 can be reduced, and productivity of helical gears produced by grinding the helical teeth 81 of the workpiece 8 with the grinding teeth 71 of the grinding wheel 7 can be enhanced.

The invention claimed is:
1. A rotary machining apparatus comprising:
 a rotary that supports and rotates a workpiece having helical teeth;
 a grinding wheel that grinds the helical teeth of the workpiece to be rotated by the rotary with grinding teeth; and
 a conveyor for carrying the workpiece in and out of the rotary, wherein
  the conveyor includes, around a turning center axis, a plurality of grippers for sandwiching the workpiece and a plurality of dressers for forming toothed surfaces of the grinding teeth, and turns around the turning center axis so that the grippers sequentially approach the rotary and the dressers sequentially approach the grinding wheel,
  dress teeth of the dressers each have different shapes of toothed surfaces, and
  an entire shape of tooth surfaces of dress teeth for one dresser of the plurality of dressers is different from an entire shape of tooth surfaces of dress teeth for another dresser of the plurality of dressers.

2. The rotary machining apparatus according to claim 1, wherein
 the dress teeth of the dressers have different shapes of the toothed surfaces in order to form toothed surfaces of the grinding teeth in such a manner that at least one of a pressure angle and a tooth profile roundness differs among toothed surfaces of the helical teeth of the workpiece.

3. The rotary machining apparatus according to claim 1, wherein
 the conveyor is structured by including a turning loader part that is turnably provided at a turning support pole through which the turning center axis passes,
 each of the grippers is structured by being provided at the turning loader part so as to be movable in an up-down direction, and sandwiching the workpiece with a pair of sandwiching parts that open and close laterally, and
 each of the dressers is fixed to the turning loader part so as not to be movable in the up-down direction.

4. The rotary machining apparatus according to claim 2, wherein
 the conveyor is structured by including a turning loader part that is turnably provided at a turning support pole through which the turning center axis passes,
 each of the grippers is structured by being provided at the turning loader part so as to be movable in an up-down direction, and sandwiching the workpiece with a pair of sandwiching parts that open and close laterally, and
 each of the dressers is fixed to the turning loader part so as not to be movable in the up-down direction.

5. The rotary machining apparatus according to claim 1, wherein
 the rotary is structured by supporting the workpiece with a workpiece supporting jig in an up-down direction,
 the workpiece supporting jig includes an upper jig part to be mounted on an upper supporting part of the rotary and a lower jig part to be mounted on a lower supporting part of the rotary, and
 the grippers are structured so as to sandwich the workpiece and also to sandwich the lower jig part on which the upper jig part is mounted.

6. The rotary machining apparatus according to claim 2, wherein
 the rotary is structured by supporting the workpiece with a workpiece supporting jig in an up-down direction,
 the workpiece supporting jig includes an upper jig part to be mounted on an upper supporting part of the rotary and a lower jig part to be mounted on a lower supporting part of the rotary, and the grippers are structured so as to sandwich the workpiece and also to sandwich the lower jig part on which the upper jig part is mounted.

7. The rotary machining apparatus according to claim 3, wherein
the rotary is structured by supporting the workpiece with a workpiece supporting jig in the up-down direction,
the workpiece supporting jig includes an upper jig part to be mounted on an upper supporting part of the rotary and a lower jig part to be mounted on a lower supporting part of the rotary, and
the grippers are structured so as to sandwich the workpiece and also to sandwich the lower jig part on which the upper jig part is mounted.

8. The rotary machining apparatus according to claim 4, wherein
the rotary is structured by supporting the workpiece with a workpiece supporting jig in the up-down direction,
the workpiece supporting jig includes an upper jig part to be mounted on an upper supporting part of the rotary and a lower jig part to be mounted on a lower supporting part of the rotary, and
the grippers are structured so as to sandwich the workpiece and also to sandwich the lower jig part on which the upper jig part is mounted.

9. A machining method using the rotary machining apparatus according to claim 1, wherein
the grinding wheel grinds a plurality of types of workpieces having different shapes of toothed surfaces of the helical teeth by using the grinding teeth formed by the dressers.

10. A machining method using the rotary machining apparatus according to claim 2, wherein
the grinding wheel grinds a plurality of types of workpieces having different shapes of toothed surfaces of the helical teeth by using the grinding teeth formed by the dressers.

11. A machining method using the rotary machining apparatus according to claim 3, wherein
the grinding wheel grinds a plurality of types of workpieces having different shapes of toothed surfaces of the helical teeth by using the grinding teeth formed by the dressers.

12. A machining method using the rotary machining apparatus according to claim 4, wherein
the grinding wheel grinds a plurality of types of workpieces having different shapes of toothed surfaces of the helical teeth by using the grinding teeth formed by the dressers.

13. A machining method using the rotary machining apparatus according to claim 5, wherein
the grinding wheel grinds a plurality of types of workpieces having different shapes of toothed surfaces of the helical teeth by using the grinding teeth formed by the dressers.

14. A machining method using the rotary machining apparatus according to claim 6, wherein
the grinding wheel grinds a plurality of types of workpieces having different shapes of toothed surfaces of the helical teeth by using the grinding teeth formed by the dressers.

15. A machining method using the rotary machining apparatus according to claim 7, wherein
the grinding wheel grinds a plurality of types of workpieces having different shapes of toothed surfaces of the helical teeth by using the grinding teeth formed by the dressers.

16. A machining method using the rotary machining apparatus according to claim 8, wherein
the grinding wheel grinds a plurality of types of workpieces having different shapes of toothed surfaces of the helical teeth by using the grinding teeth formed by the dressers.

17. The machining method using the rotary machining apparatus according to claim 9, wherein
the plurality of types of workpieces to be grinded with the grinding teeth of the grinding wheel are a pair of gears to be intermeshed with each other and to be used.

18. The machining method using the rotary machining apparatus according to claim 10, wherein
the plurality of types of workpieces to be grinded with the grinding teeth of the grinding wheel are a pair of gears to be intermeshed with each other and to be used.

19. The machining method using the rotary machining apparatus according to claim 11, wherein
the plurality of types of workpieces to be grinded with the grinding teeth of the grinding wheel are a pair of gears to be intermeshed with each other and to be used.

20. The machining method using the rotary machining apparatus according to claim 13, wherein
the plurality of types of workpieces to be grinded with the grinding teeth of the grinding wheel are a pair of gears to be intermeshed with each other and to be used.

* * * * *